US007286859B2

(12) United States Patent
Cunningham et al.

(10) Patent No.: US 7,286,859 B2
(45) Date of Patent: Oct. 23, 2007

(54) ADAPTIVE RADIO FREQUENCY WAKEUP DETECTION

(75) Inventors: Ken Cunningham, Livonia, MI (US); Sam Heap, Canton, MI (US); Greg McCormick, Dearborn, MI (US); William Cruickshank, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 480 days.

(21) Appl. No.: 10/993,860

(22) Filed: Nov. 19, 2004

(65) Prior Publication Data

US 2006/0111062 A1    May 25, 2006

(51) Int. Cl.
*H04B 1/38* (2006.01)
*H04M 1/00* (2006.01)
*B60R 25/10* (2006.01)

(52) U.S. Cl. ............... 455/574; 455/572; 340/539.3

(58) Field of Classification Search ............. 455/574, 455/572, 550.1, 41.2, 39, 343.5, 152.1, 345, 455/343.2, 343.1; 340/7.32, 447, 539.3, 340/539.1, 442, 426.13, 426.14, 426.36
See application file for complete search history.

(56) References Cited

U.S. PATENT DOCUMENTS

| 5,305,459 | A |   | 4/1994  | Rydel                      |
|-----------|---|---|---------|----------------------------|
| 5,656,993 | A | * | 8/1997  | Coulthard ........... 340/442 |
| 5,661,651 | A | * | 8/1997  | Geschke et al. ....... 701/88 |
| 5,783,992 | A | * | 7/1998  | Eberwine et al. ..... 340/445 |
| 5,973,611 | A |   | 10/1999 | Kulha et al.               |
| 6,271,748 | B1 | * | 8/2001 | Derbyshire et al. ..... 340/442 |
| 6,292,096 | B1 | * | 9/2001 | Munch et al. ......... 340/445 |
| 6,367,022 | B1 |   | 4/2002 | Gillespie et al.            |
| 6,535,116 | B1 | * | 3/2003 | Zhou ................ 340/447 |
| 6,580,364 | B1 | * | 6/2003 | Munch et al. ......... 340/447 |
| 6,600,428 | B1 | * | 7/2003 | O'Toole et al. ...... 340/825.36 |
| 6,803,855 | B2 |   | 10/2004 | Selektor et al.          |
| 6,825,773 | B1 | * | 11/2004 | O'Toole et al. ..... 340/825.72 |
| 7,040,154 | B2 | * | 5/2006 | Shaw et al. ............ 73/146.5 |
| 7,154,414 | B2 | * | 12/2006 | King et al. ........... 340/870.28 |
| 7,170,867 | B2 | * | 1/2007 | O'Toole et al. .......... 370/311 |
| 2001/0010491 | A1 |   | 8/2001 | Mameweck et al.        |

* cited by examiner

*Primary Examiner*—Sonny Trinh
(74) *Attorney, Agent, or Firm*—MacMillian Sobanski & Todd, LLC

(57) ABSTRACT

A method is provided for detecting the broadcasting of a RF message from a remote transmitter to an in-vehicle receiver. The RF message includes an initial preamble having a plurality of pulses. Power is provided to the receiver for a first predetermined period of time. The preamble pulses received are counted. A determination is made whether the number of preamble pulses received is between a first and second predetermined number of preamble pulses. If the number of preamble pulses is greater than the first predetermined number of preamble pulses, then power is provided to the receiver for processing the RF message. If the number of preamble pulses is less than the second predetermined number of preamble pulses, then power is terminated to the receiver. If the number of preamble pulses are between the first and second predetermined number of preamble pulses, then power is extended to the receiver for an extended period of time.

20 Claims, 2 Drawing Sheets

ADAPTIVE RADIO FREQUENCY WAKEUP DETECTION

CROSS REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

The present invention relates in general to adaptively determining the presence of a RF signal received by a receiver upon entering a wake state, and more specifically, to extending the period of time of the wake state for determining the presence of the RF signal.

2. Description of the Related Art

RF receivers in vehicle control modules typically cycle between a sleep state and wake state for conserving power while monitoring for the presence of incoming signals. When transitioning from the sleep state to the wake state, power is supplied only to those components that are necessary to determine if a RF signal is present. A low current power source is typically provided to those components for detecting the presence of the received RF signal. This allows for a minimum amount of power consumption while detecting the presence of a valid signal. If a determination is made that the signal is present, then those components of the vehicle control module that are required to process the received signal and perform any control action are fully powered.

The time allocated to detect a RF signal is minimal due to the duty cycling between the sleep state and the awake state. This time allocation for detecting the RF signal must be of a sufficient duration to receive a minimum number of data pulses for determining whether a valid signal is present. An additional concern is the detection of a RF signal from that of noise. Some data protocols include a quiet time where no data transmission occurs between a transmission of data packets. This quiet time may produce noise in the absence of a transmitted signal due to the tuning of the RF circuitry. As a result, the control module may possibly wake up to noise or wake up at a time when no signal is being transmitted or noise is present. Noise on a circuit may resemble that of a data pulse. Furthermore, the control module may wake up during the transmission and only receive a portion of the transmitted signal. Having received less than a minimum amount of transmitted data pulses required to analyze and make a determination that a RF signal is present the control module would enter the sleep state not realizing that a RF signal is being transmitted.

SUMMARY OF THE INVENTION

In one aspect of the present invention, a method is provided for selectively providing power to a receiver for determining whether an RF message is present by detecting the number of preamble pulses received within a predetermined period of time and extending power to the receiver for an extended period of time if the number of preamble pulses received is within a predetermined range.

A method is provided for detecting the broadcasting of a RF message from a remote transmitter to an in-vehicle receiver. The RF message includes an initial preamble having a plurality of pulses. Power is provided to the receiver for a first predetermined period of time. The number of preamble pulses received during the first predetermined period of time is counted. A determination is made whether the number of preamble pulses received during the first predetermined period of time is between a first predetermined number of preamble pulses and a second predetermined number of preamble pulses. If the number of preamble pulses is greater than the first predetermined number of preamble pulses, then power is provided to the receiver for processing the RF message. If the number of preamble pulses are less than the second predetermined number of preamble pulses, then automatically terminating power to the receiver after the first predetermined period of time. If the number of preamble pulses are between the first predetermined number of preamble pulses and the second predetermined number of preamble pulses, then extending the power to the receiver for an extended period of time.

DETAILED DESCRIPTION OF PREFERRED EMBODIMENTS

Figure 1:
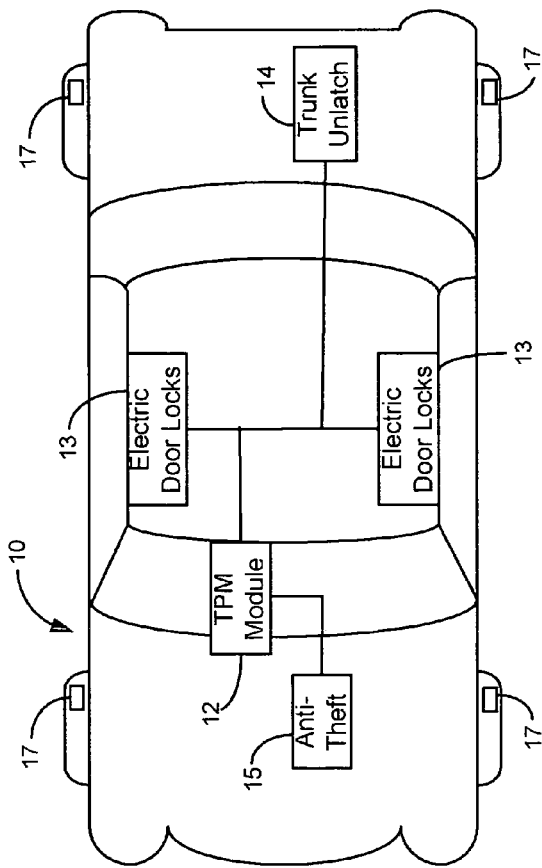
FIG. 1 is a perspective view of a tire pressure monitoring system according to an embodiment of the present invention.
Figure 1:
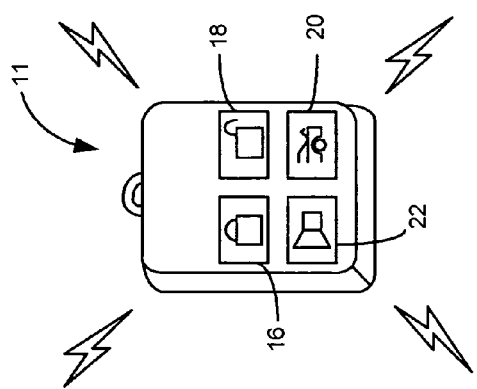

FIG. 1 shows a first remote transmitter such as a tire pressure monitoring (TPM) transmitter 17 disposed within each tire of a vehicle 10 for broadcasting RF messages containing tire pressure data to a TPM module 12 located within the vehicle 10. The TPM module 12 receives and determines the validity of the broadcast RF signal. In another preferred embodiment, a second remote transmitter may include a remote keyless entry (RKE) fob 11 for broadcasting RF signals to a remote keyless entry (RKE) module located within the vehicle 10 for actuating vehicle entry functions such as unlocking and locking a vehicle door 13, unlatching a trunk latch 14, and for activating and deactivating a vehicle alarm system 15. The RKE module is preferably integrated with the TPM module 12, although, both module may be separated. A vehicle lock switch 16 and a vehicle unlock switch 18 are commonly disposed on a face of the RKE fob 11. The RKE fob 11 may further include a trunk unlatch switch 20 and an alarm switch 22 for activating and deactivating a vehicle alarm.

Figure 2:
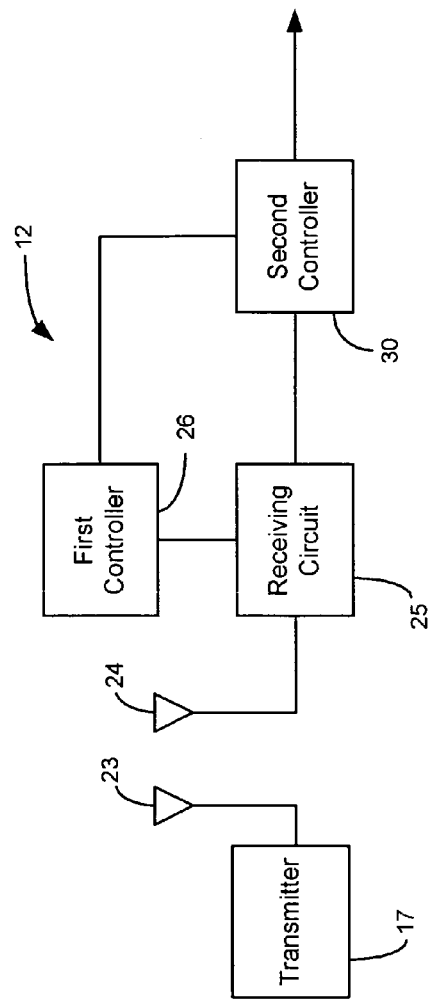
FIG. 2 is a block diagram of a vehicular remote keyless entry system according to an embodiment of the present invention.

FIG. 2 illustrates a block diagram of a TPM control system for detecting the broadcast of a RF message from a remote transmitter to a receiver in a vehicle control module. The TPM module 12 is shown to include a receiving circuit 25 for receiving the RF message from the TPM transmitter 17, or alternatively, the RKE fob transmitter 11. The TPM transmitter 17 is a remote device that transmits the RF message via antenna 23. The RF message includes a data packet. The data packet typically contains a preamble followed by encoded data. The preamble includes a series of pulses, typically 0 to 5 volts, having a predetermined width between each pulse. The pulses signify that transmitted data is to follow. The preamble is used to synchronize the communication transmission between two devices. This ensures that the receiving device can correctly interpret when the data transmission starts. The actual number and width of the pulses may vary dependent upon the specific application.

In the preferred embodiment, the TPM module 12 includes a receiving circuit 25, a first controller 26, and a second controller 30. The first controller 26 includes a strobing circuit for selectively providing low current power to energize and de-energize the receiving circuit 25 between an awake state and a sleep state, respectively. Cycling the receiving circuit 25 between the awake state and the sleep state minimizes the amount of energy consumed by the receiving circuit 25. An antenna 24 is coupled to the receiving circuit 25 for receiving the broadcast RF message when in the awake state. The receiving circuit 25 is in a wake state for a first predetermined period of time such as 5 milliseconds. Alternatively, other time periods may be utilized. The first controller 26 is preferably a microcontroller such as a microprocessor. The first controller 26 monitors the number of preamble pulses received while in the awake state and includes a counter for counting the number of preamble pulses received during the first predetermined period of time of the awake state. The second controller 30 is maintained in a sleep state until an adequate number of preamble pulses are received thereby indicating that the RF message is valid. The second microcontroller 26 is thereafter energized to an awake state to process the encoded data portion of the received RF message. In alternative embodiments, the functionality of the first controller and second controller may be integrated into a single controller thereby eliminating the additional controller.

In the preferred embodiment, the first controller 26 cycles the receiving circuit 25 between an awake state having an on-time of preferably 5 milliseconds and a sleep state of preferably 37 milliseconds. Alternatively, other on and off times may be used. Since the receiving circuit 25 transitions between an awake and sleep state, the receiving circuit 25 may awake to potentially receive the beginning of the RF message transmission, a portion of the RF message transmission, or no signal transmission.

When the receiving circuit 25 enters the awake state, the receiving circuit 25 may receive the RF message if the TPM transmitter 17 is currently transmitting the RF message. The first controller 26 monitors the number of preamble pulses received by the receiving circuit 25 over the first predetermined period of time. To establish that a valid RF message is received, a first predetermined number of preamble pulses must be received during the first predetermined period of time. Noise in the absence of a RF message may resemble a preamble pulse, however, receiving an RF message having the first predetermined number of preamble pulses each equally timed concludes that the RF message is being received. In the preferred embodiment, the first predetermined number of preamble pulses is 10. Alternatively, more or less preamble pulses may be used for validating that the RF message is present. If the first predetermined number of preamble pulses are received during the first predetermined period of time, then the first controller 26 provides quiescent current (Q-current) to the receiving circuit 25 and to the second controller 30 for receiving and processing the encoded data of the RF message. After the second controller 30 processes the encoded data in the RF message, control signals are provided for actuating control actions such as low tire pressure warnings based on the received tire pressure information. In addition, the RF message data may contain keyless entry data for activating a vehicle entry device of the vehicle.

Since the RF message is preferably an asynchronous signal, the receiving circuit 25 may not wake to the initial transmission of the RF message, namely the initial transmission of preamble pulses. Depending upon when the receiving circuit 25 is energized, there may be an insufficient amount of time during the first predetermined period of time to receive the first predetermined number of preamble pulses for determining that a valid RF message is present. If less than the first predetermined number of preamble pulses are received, then a determination is made if the number of preamble pulses received are equal to or greater than a second predetermined number of preamble pulses, where the first predetermined number of preamble pulses are greater than the second predetermined number of preamble pulses. In the preferred embodiment, the second predetermined number of preamble pulses is 4. In other preferred embodiments, the second predetermined number of preamble pulses other than 4 may be used. If the first controller 26 determines that the number of preamble pulses received during the first period of time is greater than or equal to 4 but less than 10, then power to the receiving circuit 25 is extended for an extended period of time. Since the determination for providing power for the extended period of time to the receiving circuit 25 is based on receiving less than the number of pulses required for validating that the RF message is present (i.e., less than the first predetermined number of pulses), then a further determination is made prior to extending the time period by inquiring whether the last preamble pulse received is valid. Validity of the last preamble pulse is determined by the length of time between the second from last preamble pulse received and the last preamble pulse received. The transmission time between pulses is determined by comparing the width between the leading edges (or the falling edges) of the last two preamble pulses. If the last preamble pulse is determined invalid, then power is not provided for an extended period of time and power is terminated to the receiving circuit 25 after the first period of time.

If less than the second predetermined number of preamble pulses is received during the first predetermined period of time, then it is concluded that no RF message is present and the receiver enters the sleep mode.

Figure 3:
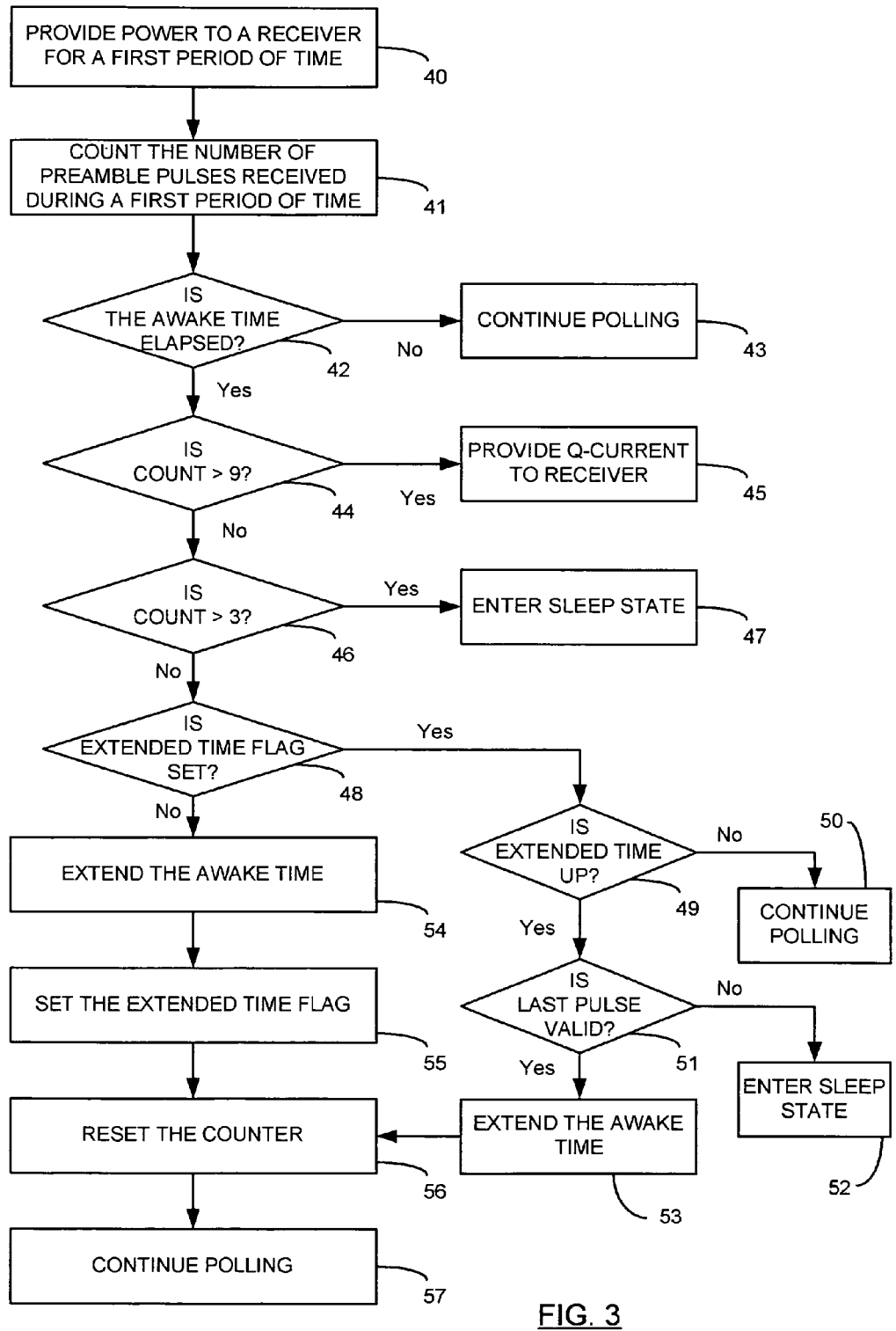
FIG. 3 is a flowchart for detecting the presence of a broadcast RF message according to a first embodiment of the present invention.

FIG. 3 illustrates a method for detecting a message in a receiver when transitioning between a wake state and a sleep state. In step 40, a receiver is energized for a first period of time for receiving a RF message. In step 41, a counter is set to zero and the number of preamble pulses received by the receiving circuit during the first predetermined period of time is counted. In step 42, a determination is made whether the first predetermined period of time has elapsed. If the determination is made that the first predetermined period of time has not elapsed, then the receiver continues polling (i.e., counting the number of preamble pulses received) during the remainder of the first period of time in step 43. If the determination is made that the first predetermined period of time has elapsed, then a determination is made in step 44 whether the count is greater than or equal to the first predetermined number of preamble pulses (e.g., 10). A count equal to or greater than the first predetermined number of preamble pulses indicates that a RF message is present. In step 45, Q-current is provided to the receiving circuit to energize other components (e.g., the second microprocessor) to an awake state for processing the RF message and providing control actions accordingly. If the number of preamble pulses received is less than 10, then a determination is made in step 46 whether the number of preamble pulses received is greater than or equal to the second predetermined number of preamble pulses (e.g., 4). If less than 4 preamble pulses are received, then power is terminated to the receiving circuit after the first predetermined period of time has elapsed and the receiving circuit enters the sleep state in step 47.

A number of preamble pulses received during the first predetermined period of time less than 10 but greater to or equal 4 indicates that potentially a RF message is present and power may be extended further for determining whether the RF message is present. Since there is an insufficient amount of preamble pulsed received accurately determined whether the RF message is present, power may be provided for an extended period of time to receive the required number of preamble pulses for make this determination. In step 48, an extended time flag is set. If the determination is made in step 46 that less than 4 preamble pulses have been received, then the receiving circuit enters a sleep state in step 47. If the determination is made in step 46 that the receiving circuit received 4 or more preamble pulses, then a determination is made whether the extended time flag is set in step 48. If the determination is made in step 48 that the extended time flag is not set, then the awake time is extended in step 54. The extended time flag is thereafter set is step 55 and the counter is reset to zero in step 56. In step 57, the receiving circuit continues to poll for preamble pulses.

If the determination is made in step 48 that the extended time flag is set, then a determination is made in step 49 whether the extended time is up. If the extended time has not elapsed, the polling is continued in step 50. If the determination is made in step 50 that the extended time is up, then a determination is made in step 51 whether the last preamble pulse received is valid. If the determination is made that the last preamble pulse is invalid, then power is terminated and the receiving circuit enters a sleep mode in step 52. If the determination is made in step 51 that the last preamble pulse is valid, then the power provided to the receiving circuit is extended for an extended period of time in step 53. The counter is then reset in step 54 and the receiving circuit continues to poll in step 57.

From the foregoing description, one ordinarily skilled in the art can easily ascertain the essential characteristics of this invention and, without departing from the spirit and scope thereof, can make various changes and modifications to the invention to adapt it to various usages and conditions. For example, various applications having RF functionality utilizing the adaptive wakeup detection method may further include, but is not limited to, remote start, remote stop, automatic sliding doors, and open/close window functions.

What is claimed is:

1. A method of detecting the broadcasting of an RF message from a remote transmitter to an in-vehicle receiver, said RF message including an initial preamble having a plurality of pulses, said method comprising the steps of:
   providing power to said receiver for a first predetermined period of time;
   counting a number of preamble pulses received during said first predetermined period of time; and
   determining whether said number of preamble pulses received during said first predetermined period of time are between a first predetermined number of preamble pulses and a second predetermined number of preamble pulses;
   if said number of preamble pulses are greater than said first predetermined number of preamble pulses, then power is automatically provided to said receiver for processing said RF message;
   if said number of preamble pulses are less than said second predetermined number of preamble pulses, then automatically terminating power to said receiver after said first predetermined period of time; and
   if said number of preamble pulses are between said first predetermined number of preamble pulses and said second predetermined number of preamble pulses, then extending said power to said receiver for an extended period of time.

2. The method of claim 1 wherein said power is extended to said receiver for said extended period of time if a last received preamble pulse is determined valid.

3. The method of claim 2 wherein a counter for counting said preamble pulses is reset to zero in response to extending said power to said receiver for an extended period of time.

4. The method of claim 3 further comprising the steps of counting said preamble pulses during said extended period of time for determining whether said preamble pulses are greater than said first predetermined number in response thereto.

5. The method of claim 3 further comprising the steps of counting said preamble pulses during said extended period of time for determining whether said number of preamble pulses are between said first predetermined number of preamble pulses and said second predetermined number of preamble pulses and extending said power to said receiver for said extended period of time in response thereto.

6. The method of claim 3 further comprising the steps counting said preamble pulses during said extended period of time for determining whether said number of preamble pulses are less then said second predetermined number of preamble pulses and then automatically terminating power to said receiver after said first predetermined period of time in response thereto.

7. The method of claim 2 wherein said power to said receiver is terminated after said first predetermined period of time if said last received preamble pulse is determined invalid.

8. The method of claim 1 further comprising the step of providing said power to a microcontroller for processing said RF message in response to determining said counted number of preamble pulses is greater than said first predetermined number of preamble pulses.

9. The method of claim 8 wherein said RF receiver and said microcontroller are disposed in a tire pressure monitoring module.

10. The method of claim 8 wherein said RF receiver and said microcontroller are disposed in a remote keyless entry module.

11. The method of claim 1 wherein said remote transmitter is disposed in a remote keyless entry fob.

12. The method of claim 1 wherein said remote transmitter is disposed in a portable tire pressure monitor device.

13. A control system for detecting the broadcast of a RF message from a remote transmitter to a receiver disposed in a vehicle-based module, said system comprises:
   a receiver for receiving said RF message, said RF message including an initial preamble having a plurality of pulses;
   a first controller including a counter for determining a number of preamble pulses received during said a first predetermined period, said first controller providing power to said receiver during said first predetermined period of time;

wherein power is automatically provided to said receiver for processing said RF message if said number of pulses is greater than said first predetermined number of preamble pulses;

wherein power is automatically terminated to said receiver after said first predetermined period of time if said number of preamble pulses are less than said second predetermined number of preamble pulses; and wherein power is extended to said receiver for an extended period of time if said number of preamble pulses are between said first predetermined number of preamble pulses and said second predetermined number of preamble pulses.

14. The system of claim 13 further comprising a second controller for processing said RF message in response to said number of pulses greater than said predetermined number of preamble pulses.

15. The system of claim 13 wherein said first controller processes said RF message in response to said number of pulses greater than said predetermined number of preamble pulses.

16. The system of claim 13 wherein said vehicle-based module includes a tire pressure monitoring module for monitoring tire pressure.

17. The system of claim 13 wherein said vehicle-based module includes a keyless entry module for activating a vehicle entry function.

18. The system of claim 13 wherein said first controller includes a strobing circuit for providing cycled power to said receiver.

19. The system of claim 13 wherein said transmitter includes a tire pressure monitoring device.

20. The system of claim 13 wherein said transmitter includes a remote keyless entry fob.

* * * * *